United States Patent
Pesola et al.

(10) Patent No.: US 9,642,007 B1
(45) Date of Patent: May 2, 2017

(54) TRIGGER EVENT BASED RESPONSE EXECUTION WITH ENHANCED DATA SECURITY

(71) Applicant: The Button Corporation Oy, Helsinki (FI)

(72) Inventors: Juuso Pesola, Helsinki (FI); Jari Leminen, Helsinki (FI); Sami Pönkänen, Helsinki (FI); Harri Rautio, Helsinki (FI)

(73) Assignee: The Button Corporation Oy, Helsinki (FI)

( * ) Notice: Subject to any disclaimer, the term of this patent is extended or adjusted under 35 U.S.C. 154(b) by 0 days.

(21) Appl. No.: 15/195,304

(22) Filed: Jun. 28, 2016

(51) Int. Cl.
| | |
|---|---|
| *H04L 29/08* | (2006.01) |
| *H04W 12/06* | (2009.01) |
| *H04L 5/00* | (2006.01) |
| *H04M 1/23* | (2006.01) |
| *H04W 88/02* | (2009.01) |

(52) U.S. Cl.
CPC ........... *H04W 12/06* (2013.01); *H04L 5/0055* (2013.01); *H04L 67/306* (2013.01); *H04M 1/236* (2013.01); *H04W 88/02* (2013.01)

(58) Field of Classification Search
CPC ......... H04L 12/58; H04L 29/08; H04L 67/12; H04W 4/00; H04W 4/02; H04W 12/06
See application file for complete search history.

(56) References Cited

U.S. PATENT DOCUMENTS

| | | | |
|---|---|---|---|
| 8,832,244 B2 * | 9/2014 | Gelvin | H04L 67/12 709/201 |
| 9,247,322 B1 * | 1/2016 | Schechter | H04Q 9/00 |
| 9,301,325 B1 * | 3/2016 | Sanap | H04W 76/02 |
| 2016/0378086 A1 * | 12/2016 | Plymill | G05B 19/0428 700/284 |

* cited by examiner

*Primary Examiner* — Blane Jackson
(74) *Attorney, Agent, or Firm* — Ziegler IP Law Group, LLC

(57) ABSTRACT

The disclosed embodiments allow an extremely simple and inexpensive way to interact with various Internet and mobile telecommunications related services, for example by a single button press, and with enhanced data security. A session login request includes a user identification and an identifier of a sensor apparatus associated with the user is received at a first network server from a user terminal. In response to successfully authenticating the user identification, an association request comprising the received identifier of the sensor apparatus is sent to a second network server. A reference identifier associated with the identifier of the sensor apparatus is generated at the second network server. The generated reference identifier mapped with the identifier of the sensor apparatus is stored at the second network server. Then, the generated reference identifier is sent to the first network server for storage.

18 Claims, 3 Drawing Sheets

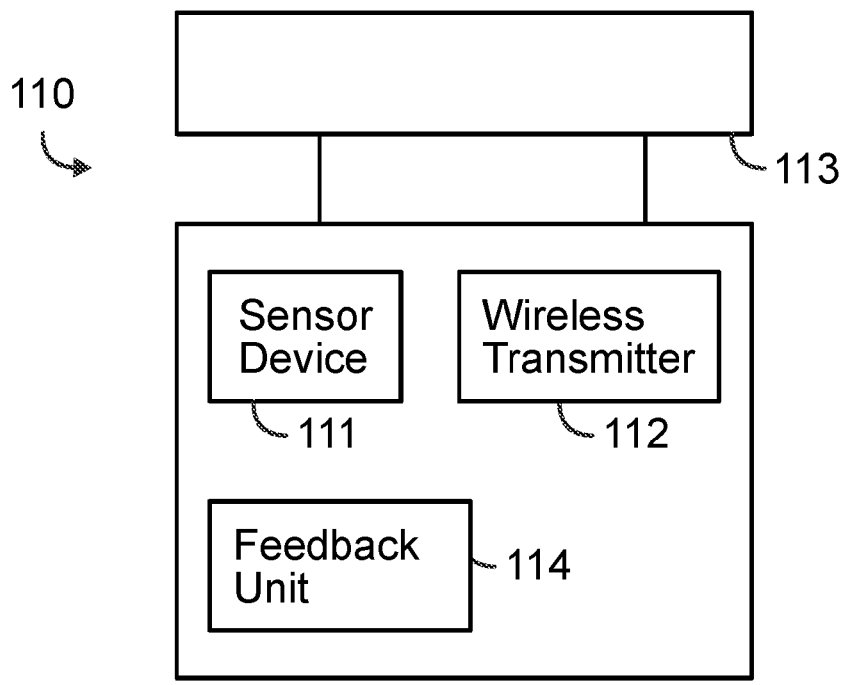
Fig. 3a
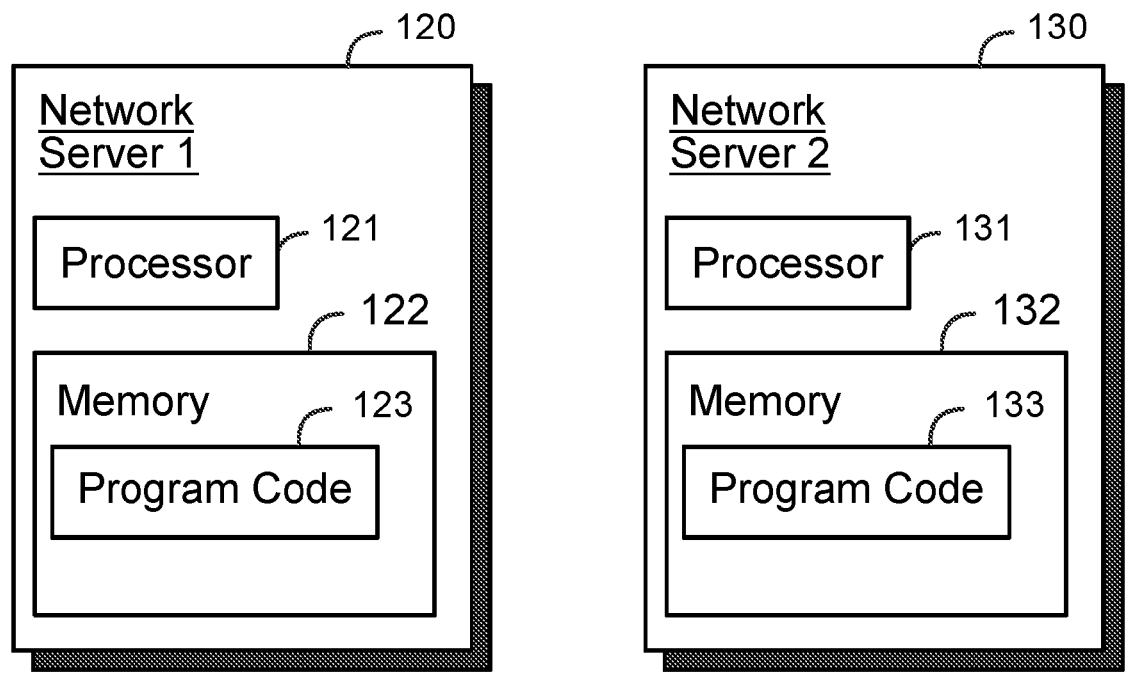
Fig. 3b                    Fig. 3c

TRIGGER EVENT BASED RESPONSE EXECUTION WITH ENHANCED DATA SECURITY

BACKGROUND

Field

The aspects of the disclosed embodiments relate to data communications. In particular, the aspects of the disclosed embodiments relate to trigger event based response execution with enhanced data security.

Description of the Related Art

Various Internet and mobile telecommunications related services have proliferated during the last decade.

While there have been efforts to simplify using these services, they still typically require several actions from the end-user and/or complex set-up operations.

Accordingly, the aspects of the disclosed embodiments are directed to alleviating the problems described above and to introduce a solution that allows an extremely simple way to interact with e.g. various Internet and mobile telecommunications related services, for example by a single button press, and that allows enhanced data security.

SUMMARY

A first aspect of the disclosed embodiments is a method in which a session login request comprising a user identification and an identifier of a sensor apparatus associated with the user is received at a first network server from a user terminal. In response to successfully authenticating the received user identification, an association request comprising the received identifier of the sensor apparatus is sent from the first network server to a second network server. A reference identifier associated with the received identifier of the sensor apparatus is generated at the second network server. The generated reference identifier mapped with the received identifier of the sensor apparatus is stored at the second network server. An association response comprising the generated reference identifier is sent from the second network server to the first network server. The received reference identifier is stored mapped with the received and authenticated user identification at the first network server. Here, the sensor apparatus associated with the user is configured to send to the second network server an action request consisting of an indication of the identifier of the sensor apparatus over a wireless communication network in response to a trigger event sensed by a sensor device comprised in the sensor apparatus.

A second aspect of the disclosed embodiments is a system that comprises a sensor apparatus associated with a user and configured to send to a second network server an action request consisting of an indication of an identifier of the sensor apparatus over a wireless communication network in response to a trigger event sensed by a sensor device comprised in the sensor apparatus. The system further comprises a first network server configured to receive, from a user terminal, a session login request comprising a user identification of the user and the identifier of the sensor apparatus associated with the user, and further configured to send, in response to successfully authenticating the received user identification, an association request comprising the received identifier of the sensor apparatus. The system further comprises a second network server configured to receive, from the first network server, the association request comprising the identifier of the sensor apparatus, to generate a reference identifier associated with the received identifier of the sensor apparatus, to store the generated reference identifier mapped with the received identifier of the sensor apparatus, and to send to the first network server an association response comprising the generated reference identifier. Here, the first network server is further configured to receive, from the second network server, the association response comprising the reference identifier, and to store the received reference identifier mapped with the received and authenticated user identification.

In an embodiment, alternatively or in addition to the above described aspects and embodiments, a session login response acknowledging successfully completed association of the identifier of the sensor apparatus with the reference identifier is sent from the first network server to the user terminal.

In an embodiment, alternatively or in addition to the above described aspects and embodiments, the operation of generating the reference identifier comprises generating a pseudorandom reference identifier.

In an embodiment, alternatively or in addition to the above described aspects and embodiments, the action request consisting of the indication of the identifier of the sensor apparatus is received at the second network server from the sensor apparatus associated with the user. The stored reference identifier mapped with the indicated identifier of the sensor apparatus is determined at the second network server. A pre-configured action profile corresponding to the determined reference identifier is accessed at the second network server. The pre-configured action profile comprises a predetermined service order to a service provider associated with the first network server. An action order comprising the determined reference identifier and the predetermined service order from the accessed pre-configured action profile is sent from the second network server to the first network server.

In an embodiment, alternatively or in addition to the above described aspects and embodiments, the stored user identification mapped with the reference identifier in the received action order is determined at the first network server. A service response in accordance with the predetermined service order in the received action order is initiated at the first network server for the determined user identification.

In an embodiment, alternatively or in addition to the above described aspects and embodiments, the sensor device is semiconductor based, and the sensed trigger event comprises a trigger event measurable with a semiconductor based sensor device.

In an embodiment, alternatively or in addition to the above described aspects and embodiments, the sensed trigger event relates to at least one of: touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, or motion in proximity of the sensor apparatus.

In an embodiment, alternatively or in addition to the above described aspects and embodiments, the sensor device comprises a button, and the trigger event consists of pressing the button.

In an embodiment, alternatively or in addition to the above described aspects and embodiments, the sensor apparatus has only a single user input device consisting of the sensor device comprised in the sensor apparatus.

It is to be understood that the aspects and embodiments of the invention described above may be used in any combination with each other. Several of the aspects and embodiments may be combined together to form a further embodiment of the invention. A system or a method which is an aspect of the invention may comprise at least one of the embodiments of the invention described above.

The aspects of the disclosed embodiments allows an extremely simple and inexpensive way to interact with e.g. various Internet and mobile telecommunications related services, for example by a single button press. The invention further allows enhanced data security.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIGS. 3a-3c are block diagrams illustrating apparatuses according to an embodiment of the invention.

DETAILED DESCRIPTION OF THE PREFERRED EMBODIMENTS

Reference will now be made in detail to the embodiments of the invention, examples of which are illustrated in the accompanying drawings.

Figure 1:
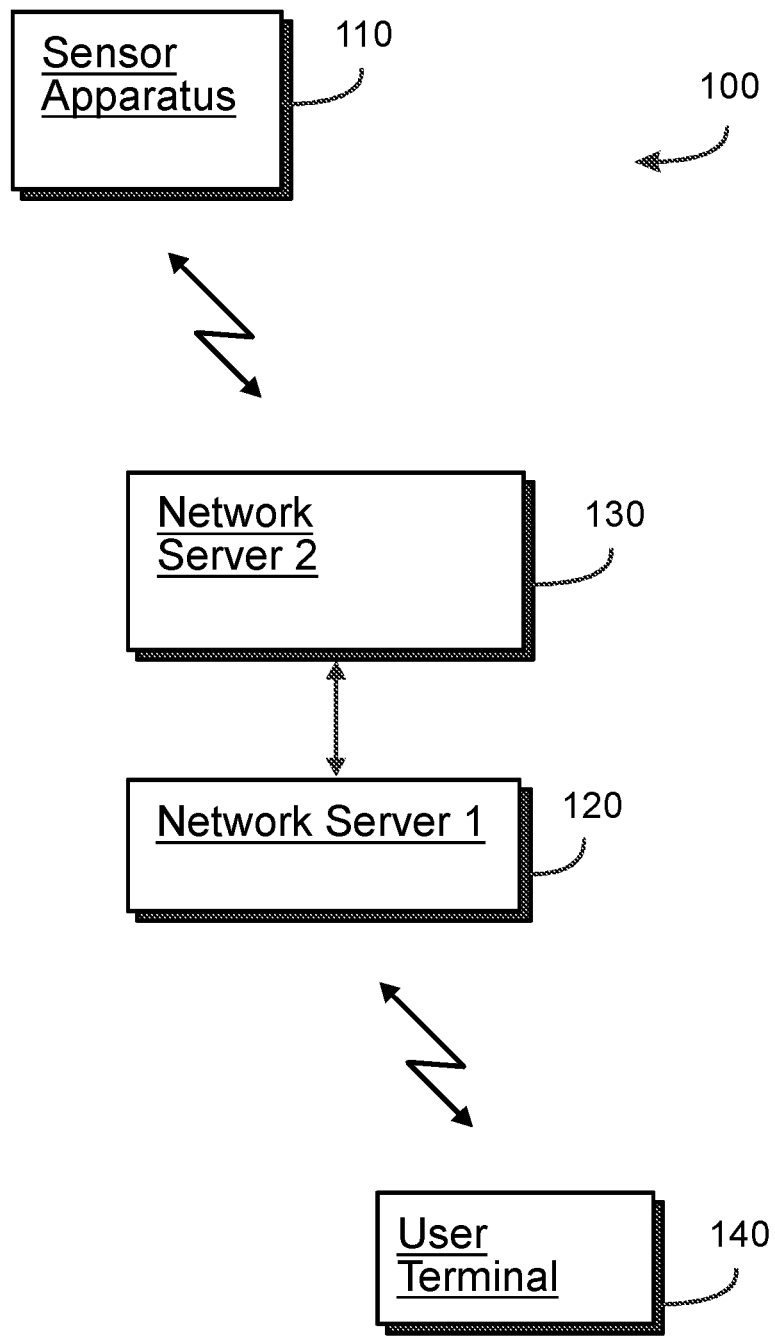
FIG. 1 is a block diagram illustrating a system according to an embodiment of the invention.

FIG. 1 is a block diagram illustrating a system 100 according to an embodiment of the invention. The system 100 comprises a sensor apparatus 110 that is configured to send to a second network server 130 an action request consisting of an indication of an identifier of the sensor apparatus 110 over a wireless communication network in response to a trigger event sensed by a sensor device 111 comprised in the sensor apparatus. As shown in more detail in FIG. 3a, the sensor apparatus 110 comprises the sensor device 111 that is configured to sense the trigger event. Furthermore, the sensor apparatus 110 comprises a wireless transmitter 112 that is configured to send the action request consisting of the indication of the identifier of the sensor apparatus 110 over a wireless communication network to the second network server 130 in response to the trigger event sensed by the sensor device 111.

Furthermore, the sensor apparatus 110 may comprise a feedback unit 114 that is configured to receive a feedback message, and to provide a feedback signal in response to the received feedback message. The feedback signal may comprise e.g. a light signal and/or a sound signal. The feedback message may be sent e.g. by the second network server 130 receiving the action request. For example, in case of a service order, the second network server 130 may send a feedback message indicating successful receipt of the service order, and the sensor apparatus 110 may then provide e.g. a predetermined light and/or sound signal indicating successful receipt of the service order to the person(s) who sent the service order.

The action request consists of the indication of the identifier of the sensor apparatus 110. The identifier itself may be e.g. a string of alphanumeric characters, and it may be e.g. printed on the sensor apparatus 110. The indication of the identifier may comprise the identifier itself. Alternatively, the indication of the identifier may comprise data that is uniquely linked or associated with the identifier, or that otherwise allows unambiguously deriving the identifier.

The sensor device 111 may be semiconductor based, and the trigger event may comprise a trigger event that can be measured with a semiconductor based sensor device. For example, trigger event may relate to at least one of: touching the sensor apparatus 110, illumination in proximity of the sensor apparatus 110, temperature in proximity of the sensor apparatus 110, position of the sensor apparatus 110, acceleration of the sensor apparatus 110, compass heading of the sensor apparatus 110, velocity of the sensor apparatus 110, and motion in proximity of the sensor apparatus 110.

As also shown in FIG. 3a, the sensor apparatus 110 may comprise a button 113. In this case, the trigger event may consist of pressing the button 113. Further in this case, the sensor device 111 may comprise e.g. a switch arrangement responsive to the button 113.

In an embodiment, the sensor apparatus 110 may have only a single user input device that consists of the sensor device 111 comprised in the sensor apparatus 110.

The system 100 further comprises a first network server 120 that is configured to receive from a user terminal 140 a session login request that comprises a user identification of the user and the identifier of the sensor apparatus 110 associated with the user. The first network server 120 is further configured to send to the second network server 130 an association request that comprises the received identifier of the sensor apparatus 110, in response to successfully authenticating the received user identification. The user identification of the user may comprise e.g. a user name and a password. The user terminal 140 may comprise e.g. a smartphone, a tablet computer, a laptop computer, a desktop computer, or the like. The user terminal 140 may be configured to send the session login request over a wireless communication network.

The wireless communication network(s) may comprise e.g. a wireless local area network (WLAN) and/or a mobile telephone network. The mobile telephone network may comprise e.g. a 2G (second generation), a 3G (third generation), 4G (fourth generation) or a 5G (fifth generation) mobile telephone network. The connections between the first network server 120 and the second network server 130 may comprise wired or wireless Internet connections. However, it is to be understood that these connection types are merely examples, and other communication connection types may additionally/alternatively be utilized.

As shown in more detail in FIG. 3b, the first network server 120 may comprise at least one processor 121 and at least one memory 122 including computer program code 123.

The system 100 further comprises the second network server 130 that is configured to receive from the first network server 120 the association request that comprises the identifier of the sensor apparatus 110. The second network server 130 is further configured to generate a reference identifier that is associated with the received identifier of the sensor apparatus 110. The second network server may be further configured to perform the generation of the reference identifier by generating a pseudorandom reference identifier. The second network server 130 is further configured to store the generated reference identifier mapped with the received identifier of the sensor apparatus 110. The second network server 130 is further configured to send to the first network server 120 an association response comprising the generated reference identifier.

As shown in more detail in FIG. 3c, the second network server 130 may comprise at least one processor 131 and at least one memory 132 including computer program code 133.

Furthermore, the first network server 120 is further configured to receive from the second network server 130 the association response comprising the reference identifier, and to store the received reference identifier mapped with the received and authenticated user identification.

The first network server 120 may be further configured to send to the user terminal 140 a session login response acknowledging successfully completed association of the identifier of the sensor apparatus 110 with the reference identifier.

The second network server 130 may be further configured to receive from the sensor apparatus 110 associated with the user the action request consisting of the indication of the identifier of the sensor apparatus 110. The second network server 130 may be further configured to determine the stored reference identifier mapped with the indicated identifier of the sensor apparatus 110. The second network server 130 may be further configured to access a pre-configured action profile corresponding to the determined reference identifier which pre-configured action profile comprises a predetermined service order to a service provider associated with the first network server 120. The second network server 130 may be further configured to send to the first network server 120 an action order comprising the determined reference identifier and the predetermined service order from the accessed pre-configured action profile.

The first network server 120 may be further configured to receive from the second network server 130 the action order comprising the determined reference identifier and the predetermined service order. The first network server 120 may be further configured to determine the stored user identification mapped with the reference identifier in the received action order. The first network server 120 may be further configured to initiate a service response in accordance with the predetermined service order in the received action order for the determined user identification.

Figure 2:
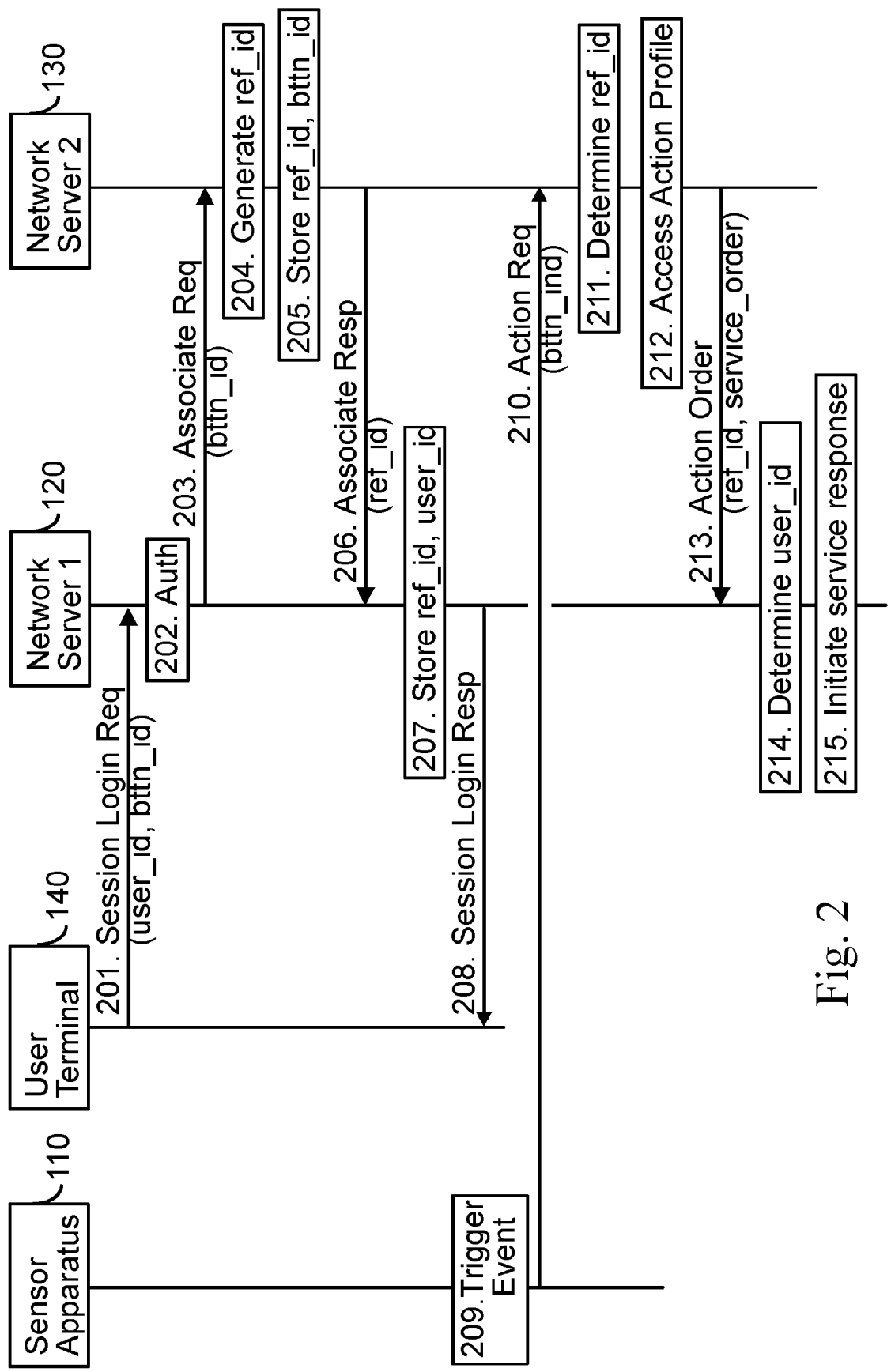
FIG. 2 is a signaling diagram illustrating a method according to an embodiment of the invention.

FIG. 2 is a signaling diagram illustrating a method according to an embodiment of the present invention.

At operation 201, a session login request comprising a user identification and an identifier of a sensor apparatus 110 associated with the user is received at a first network server 120 from a user terminal 140. As discussed above, the sensor apparatus 110 associated with the user is configured to send to the second network server 130 an action request consisting of an indication of the identifier of the sensor apparatus 110 over a wireless communication network in response to a trigger event sensed by the sensor device 111 comprised in the sensor apparatus 110.

In response to successfully authenticating the received user identification at operation 202, an association request comprising the received identifier of the sensor apparatus 110 is sent from the first network server 120 to a second network server 130, operation 203.

A reference identifier associated with the received identifier of the sensor apparatus 110 is generated at the second network server 130, operation 204. As discussed above the operation of generating the reference identifier may comprise generating a pseudorandom reference identifier. The generated reference identifier mapped with the received identifier of the sensor apparatus 110 is stored at the second network server 130, operation 205.

An association response comprising the generated reference identifier is sent from the second network server 130 to the first network server 120, operation 206. The received reference identifier is stored mapped with the received and authenticated user identification at the first network server 120, operation 207.

At optional operation 208, a session login response acknowledging successfully completed association of the identifier of the sensor apparatus 110 with the reference identifier is sent from the first network server 120 to the user terminal 140.

The operations 201-208 may be performed within a single data communication session, such as a hypertext transfer protocol (http) based data communication session.

At optional operation 209, the trigger event sensed by the sensor device 111 comprised in the sensor apparatus 110 occurs. In response, the sensor apparatus 110 sends to the second network server 130 the action request consisting of the indication of the identifier of the sensor apparatus 110 over a wireless communication network.

At optional operation 210, the action request consisting of the indication of the identifier of the sensor apparatus 110 is received at the second network server 130.

At optional operation 211, the stored reference identifier mapped with the indicated identifier of the sensor apparatus 110 is determined at the second network server 130. At optional operation 212, a pre-configured action profile corresponding to the determined reference identifier is accessed at the second network server 130. The pre-configured action profile comprises a predetermined service order to a service provider associated with the first network server 120.

At optional operation 213, an action order comprising the determined reference identifier and the predetermined service order from the accessed pre-configured action profile is sent from the second network server 130 to the first network server 120.

At optional operation 214, the previously stored user identification mapped with the reference identifier in the received action order is determined at the first network server 120.

At optional operation 215, a service response in accordance with the predetermined service order in the received action order is initiated at the first network server 120 for the determined user identification.

The predetermined service order may be e.g. an order for predetermined goods or commodities or services.

The exemplary embodiments can include, for example, any suitable servers, workstations, PCs, laptop computers, other devices, and the like, capable of performing the processes of the exemplary embodiments. The devices and subsystems of the exemplary embodiments can communicate with each other using any suitable protocol and can be implemented using one or more programmed computer systems or devices.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer can read.

While the present inventions have been de-scribed in connection with a number of exemplary embodiments, and implementations, the present inventions are not so limited, but rather cover various modifications, and equivalent arrangements, which fall within the purview of prospective claims.

What is claimed is:

1. A method, comprising:
   receiving, at a first network server from a user terminal, a session login request comprising a user identification and an identifier of a sensor apparatus associated with the user;
   in response to successfully authenticating the received user identification, sending, from the first network server to a second network server, an association request comprising the received identifier of the sensor apparatus;
   generating, at the second network server, a reference identifier associated with the received identifier of the sensor apparatus;
   storing, at the second network server, the generated reference identifier mapped with the received identifier of the sensor apparatus;
   sending, from the second network server to the first network server, an association response comprising the generated reference identifier; and
   storing, at the first network server, the received reference identifier mapped with the received and authenticated user identification,
   wherein the sensor apparatus associated with the user is configured to send to the second network server an action request consisting of an indication of the identifier of the sensor apparatus over a wireless communication network in response to a trigger event sensed by a sensor device comprised in the sensor apparatus.

2. The method according to claim 1, further comprising:
   sending, from the first network server to the user terminal, a session login response acknowledging successfully completed association of the identifier of the sensor apparatus with the reference identifier.

3. The method according to claim 1, wherein the operation of generating the reference identifier comprises generating a pseudorandom reference identifier.

4. The method according to claim 1, further comprising:
   receiving, at the second network server from the sensor apparatus associated with the user, the action request consisting of the indication of the identifier of the sensor apparatus;
   determining, at the second network server, the stored reference identifier mapped with the indicated identifier of the sensor apparatus;
   accessing, at the second network server, a pre-configured action profile corresponding to the determined reference identifier, said pre-configured action profile comprising a predetermined service order to a service provider associated with the first network server; and
   sending, from the second network server to the first network server, an action order comprising the determined reference identifier and the predetermined service order from the accessed pre-configured action profile.

5. The method according to claim 4, further comprising:
determining, at the first network server, the stored user identification mapped with the reference identifier in the received action order; and
initiating, at the first network server, a service response in accordance with the predetermined service order in the received action order for the determined user identification.

6. The method according to claim 1, wherein the sensor device is semiconductor based, and the sensed trigger event comprises a trigger event measurable with a semiconductor based sensor device.

7. The method according to claim 1, wherein the sensed trigger event relates to at least one of: touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, or motion in proximity of the sensor apparatus.

8. The method according to claim 1, wherein the sensor device comprises a button, and the trigger event consists of pressing the button.

9. The method according to claim 1, wherein the sensor apparatus has only a single user input device consisting of the sensor device comprised in the sensor apparatus.

10. A system, comprising:
a sensor apparatus associated with a user and configured to send to a second network server an action request consisting of an indication of an identifier of the sensor apparatus over a wireless communication network in response to a trigger event sensed by a sensor device comprised in the sensor apparatus;
a first network server configured to receive, from a user terminal, a session login request comprising a user identification of the user and the identifier of the sensor apparatus associated with the user, and further configured to send, in response to successfully authenticating the received user identification, an association request comprising the received identifier of the sensor apparatus; and
a second network server configured to receive, from the first network server, the association request comprising the identifier of the sensor apparatus, to generate a reference identifier associated with the received identifier of the sensor apparatus, to store the generated reference identifier mapped with the received identifier of the sensor apparatus, and to send to the first network server an association response comprising the generated reference identifier,
wherein the first network server is further configured to receive, from the second network server, the association response comprising the reference identifier, and to store the received reference identifier mapped with the received and authenticated user identification.

11. The system according to claim 10, wherein the first network server is further configured to send to the user terminal a session login response acknowledging successfully completed association of the identifier of the sensor apparatus with the reference identifier.

12. The system according to claim 10, wherein the second network server is further configured to perform the generation of the reference identifier by generating a pseudorandom reference identifier.

13. The system according to claim 10, wherein:
the second network server is further configured to receive from the sensor apparatus associated with the user the action request consisting of the indication of the identifier of the sensor apparatus, to determine the stored reference identifier mapped with the indicated identifier of the sensor apparatus, to access a pre-configured action profile corresponding to the determined reference identifier, said pre-configured action profile comprising a predetermined service order to a service provider associated with the first network server, and to send to the first network server an action order comprising the determined reference identifier and the predetermined service order from the accessed pre-configured action profile.

14. The system according to claim 13, wherein:
the first network server is further configured to receive from the second network server the action order comprising the determined reference identifier and the predetermined service order, to determine the stored user identification mapped with the reference identifier in the received action order, and to initiate a service response in accordance with the predetermined service order in the received action order for the determined user identification.

15. The system according to claim 10, wherein the sensor device is semiconductor based, and the sensed trigger event comprises a trigger event measurable with a semiconductor based sensor device.

16. The system according to claim 10, wherein the sensed trigger event relates to at least one of: touching the sensor apparatus, illumination in proximity of the sensor apparatus, temperature in proximity of the sensor apparatus, position of the sensor apparatus, acceleration of the sensor apparatus, compass heading of the sensor apparatus, velocity of the sensor apparatus, or motion in proximity of the sensor apparatus.

17. The system according to claim 10, wherein the sensor device comprises a button, and the trigger event consists of pressing the button.

18. The system according to claim 10, wherein the sensor apparatus has only a single user input device consisting of the sensor device comprised in the sensor apparatus.

\* \* \* \* \*